June 14, 1960
J. L. SCHUCKER ET AL
2,940,375
AIR FLOW DEFLECTOR DEVICE
Filed Sept. 7, 1954
2 Sheets-Sheet 1
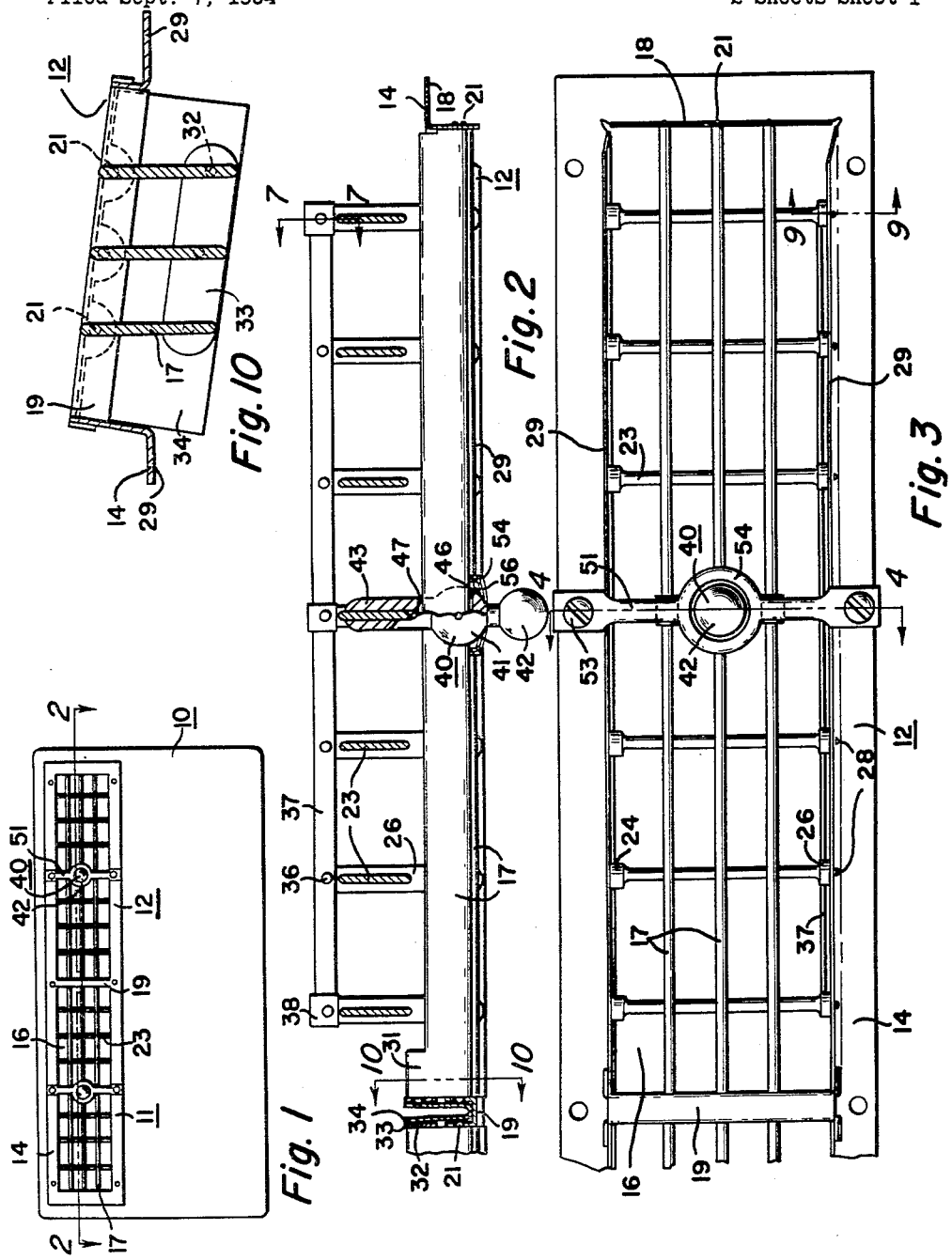
INVENTOR.
James L. Schucker
BY Clarence I. Vellner.
R. R. Candor.
Their Attorney June 14, 1960 J. L. SCHUCKER ET AL 2,940,375
AIR FLOW DEFLECTOR DEVICE
Filed Sept. 7, 1954 2 Sheets-Sheet 2
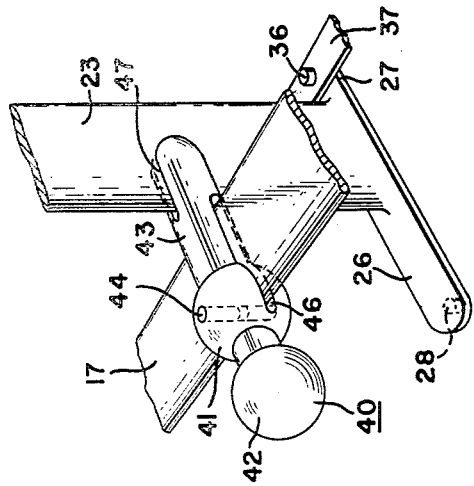
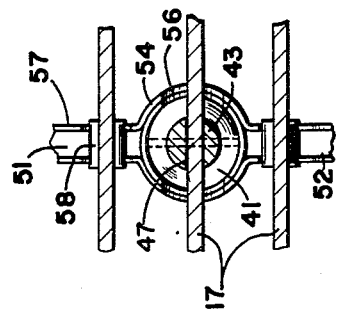
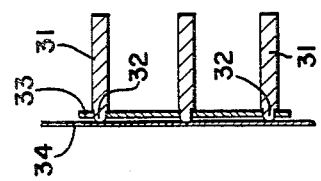
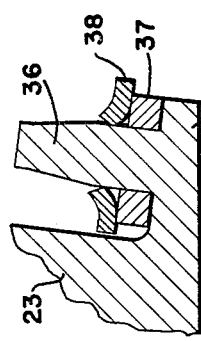
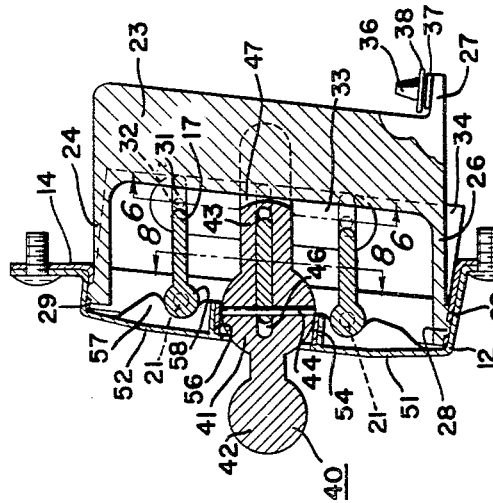
INVENTOR.
James L. Schucker
BY Clarence I. Vellner.
R.R. Candor.
Their Attorney

United States Patent Office 2,940,375
Patented June 14, 1960

2,940,375
AIR FLOW DEFLECTOR DEVICE

James L. Schucker, Royal Oak, and Clarence I. Vellner, Detroit, Mich., assignors to General Motors Corporation, Detroit, Mich., a corporation of Delaware Filed Sept. 7, 1954, Ser. No. 454,480

3 Claims. (Cl. 98—40)

This invention relates to refrigerating apparatus and particularly to an air outlet grill for use on air cooling and conditioning cabinets.

An object of our invention is to provide an improved air outlet grill for adjustably directing and controlling the flow of air out of the grill in a plurality of directions.

Another object of our invention is to provide in the air passage of a frame of an air outlet grill for an air cooling apparatus or cabinet a plurality of sets of intersecting vanes for controlling the direction of air leaving the passage and which sets of vanes may have their positions adjusted simultaneously and/or independent of one another.

In carrying out the foregoing objects, it is a still further object of our invention to provide a plurality of sets of intersecting vanes in an air outlet grill with a single or common actuator movable in one plane to adjust the position of the vanes of one set thereof, movable in another different plane to adjust the position of the vanes of the other set thereof independent of the position or movement of the one set of vanes and movable in still another plane intermediate its one and another different planes of movement to simultaneously move and adjust the position of the vanes of both sets of vanes.

Further objects and advantages of the present invention will be apparent from the following description, reference being had to the accompanying drawings, wherein preferred embodiments of the present invention are clearly shown.

In the drawings:

Figure 1 is a front view of an air cooling and conditioning cabinet having two of our improved outlet grills incorporated therein;

Figure 2 is an enlarged horizontal sectional view taken on the line 2—2 of Figure 1 showing one of our improved outlet grills;

Figure 3 is a front view of the outlet grill shown in Figure 2;

Figure 4 is a vertical sectional view taken on the line 4—4 of Figure 3 showing the pivotal mounting of a common grill vane actuator to the grill structure;

Figure 5 is a fragmentary perspective view of the common actuator showing its connection to a vane of each of the sets of vanes employed in our grill;

Figure 6 is an enlarged sectional view taken on the line 6—6 of Figure 4 showing a means for connecting or tying the vanes of one set thereof to each other;

Figure 7 is an enlarged sectional view taken on the line 7—7 of Figure 2 showing a member connecting or tying vanes of another set to each other;

Figure 8 is a sectional view taken on the line 8—8 of Figure 4 showing a ball-like portion of the actuator movably disposed in a socket on the grill;

Figure 9 is an enlarged sectional view taken on the line 9—9 of Figure 3 showing the pivotal mounting of a vane upon the grill frame; and Figure 10 is an enlarged sectional view taken on the line 10—10 of Figure 2 showing the mounting of vanes upon a divider member in the grill structure.

Referring to the drawings, there is shown in Figure 1 thereof an air conditioning unit, generally represented by the reference character 10, of the type adapted to be supported on a window sill of a room and having two air outlet grills, generally represented by the reference characters 11 and 12, constructed in accordance with this invention mounted in side-by-side relation in a wall of unit 10. A refrigerating system within unit 10 cools air entering the unit and a fan or blower therein discharges the cooled air out of the unit through the grills 11 and 12 into a space or room to be conditioned.

Each outlet grill 11 and 12 comprises a substantially rectangular main frame 14 bounding an elongated air outlet passage or slot 16 therein through which the cooled or conditioned air flows or is discharged. A plurality of vertically spaced apart horizontally extending air deflector plates, blades or vanes 17 are disposed within passage 16 and extend along the length of this passage or slot. Vanes 17 are pivotally mounted upon a flange 18 along one of the short sides of frame 14 (see Figure 3) and are pivotally mounted at their other end to a metal divider piece 19 secured, in any suitable manner, to frame 14 intermediate the two grill structures 11 and 12 (see Figures 3 and 10). Vanes 17 form or provide the air outlet grill 12 disclosed with one or a first set of vanes. Each end of the vanes 17 is provided with a round projection 21 which extends into and through suitable round horizontally aligned holes provided in the flange 18 and in divider 19 for pivotally mounting the vanes to frame 14. The axis of the mounting projections 21 of each vane 17 of the one set of vanes are all disposed in a single straight line plane. Another group of horizontally spaced apart vanes 23, located in back of and extending transversely across the set of vanes 17, form a second set of vanes for the grill 12. Each vane 23 of the second set thereof includes forwardly directed upper and lower legs 24 and 26, extending over the uppermost and lowermost vanes 17 respectively, and a tail 27 (see Figure 4). Each leg 24 and 26 of the vanes 23 have a round projection 28 thereon extending outwardly therefrom into a suitable round hole provided in the flange 29 (see Figures 3, 4 and 9) along the long sides of frame 14 to pivotally mount to vanes 23 thereon. Each of the long vanes 17 has a rearwardly extending portion 31 (see Figures 2, 6 and 10) provided on its one side with a round projection 32 which fits into a suitable round hole provided in a metal link 33. The link 33 connects or ties the vanes 17 of the first set of vanes together for movement in unison. A spring member 34 suitably held in place on divider 19, between the grills 11 and 12 (see Figures 2, 6 and 10), engages the projections 32 on vanes 17 to retain link 33 upon these projections and to apply a slight pressure on vanes 17, thus affording a resistance to movement of vanes 17 so that the vanes will remain in any one of a plurality of adjusted positions attained as will be hereinafter described. Each of the vanes 23 of the second set thereof has a round tapered stud-like portion 36 extending upwardly from the tail 27 thereon (see Figure 4). A thin metal strap 37 is provided with a plurality of spaced apart round holes, each of which receive the stud portion 36 on vanes 23 (see Figure 2). Strap 37 forms a means of connecting or a link for tying the vanes 23 of the second set thereof to one another for movement in unison. A sheet metal lock nut 38, of any conventional or suitable design, is tightly pressed upon the stud-like portion 36 of certain of the vanes 23 (see Figures 2 and 7) to secure link 37 thereon. The axis of the pivotal mounting projections 28 on legs 24 and 26 of vanes 23 of the second set of vanes are all located or disposed in the same single straight line plane with the pivotal mounting projections 21 of vanes 17 of the first set of vanes (see Figure 4). Vanes 17 of the first set thereof and vanes 23 of the second set thereof may be of one-piece construction and made of molded plastic material such as synthetic resins or the like.

The user of an air cooling and conditioning unit may wish to adjust the position of one set of air deflecting vanes independently of another set of vanes and/or may wish to adjust the position of both sets of vanes simultaneously. To this end and in accordance with the objects of our invention we pivotally mount a lever control actuator upon one of the long vanes 17 and provide the same with a connection with one of the vanes 23 so that it forms in effect a manually movable universal joint device. A vane actuator lever, generally indicated by the reference character 40, comprising a ball-like central portion 41, an integral handle or knob 42 extended from one side thereof and an integral shaft-like portion 43 extended from a side thereof opposite knob 42, is pivotally mounted as by a pin 44 upon the central-most vane 17 of the first set of vanes (see Figures 4 and 5). This mounting pin 44 is disposed in the same straight line plane with the axis of the pivotal mounting projections 21 and 28 on vanes 17 and 23 (see Figure 4). The actuator 40 is hollowed out as at 46 and receives the center vane 17 when the actuator is slipped thereover. The end of shaft-like portion 43 of the actuator is slotted as at 47 to provide a pair of legs which straddle and are adapted to engage opposite sides of the central-most vane 23 of the second set of vanes (see Figure 5). A guide piece 51 located in the center of frame 14 has legs 52 secured thereto by screws 53 and is provided with a round hole, flanged as at 54 (see Figures 4 and 8), which receives a metal sleeve 56. Sleeve 56 forms a socket-like bearing for the ball-like central portion 41 of actuator 40. The central guide piece 51 in addition to augmenting the support of the vane actuator also has means thereon forming socket-like bearing surfaces for the center portion of the two vanes 17 above and below the vane upon which the actuator 40 is pivotally mounted. In-turned ears 57 on this piece 51 are provided with a socket portion (see Figure 4) for receiving a short rounded enlargement 58 (see Figures 4 and 8) formed integrally on the upper and lower vanes 17. The enlargement 58 on these vanes, supported in the socket portion of ears 57, increases the structural strength of vanes 17 and provides a central bearing for their pivotal movement. It is to be understood that the actuator 40, upon applying force to handle on knob 42 thereof, can be moved about its pivotal mounting pin 44 in a direction or plane paralleling the extension of vanes 17 and can be moved in an up and down direction or plane paralleling the extension of vanes 23. By virtue of locating or disposing the pivotal mountings of all the vanes of the sets 17 and 23 thereof in a single straight line and of locating the pivotal mounting point or pin 44 of the vane actuator on this straight single line plane the actuator 40 can also be moved in an angular direction or plane intermediate straight horizontal movements and straight perpendicular movements thereof. The lever actuator 40 forms a common or a single actuating means for moving all of the vanes of the sets thereof simultaneously and/or one set or another relative to each other at a time.

Having described the structure of a grill constructed in accordance with our invention, it is now appropriate to explain the manner in which the position of the sets of vanes are adjusted in unison independent of one another or simultaneously with each other. By grasping knob 42 of the common actuator 40 and applying an upward force thereto in a vertical plane, it causes the central-most vane 17 of the first set of vanes to swing or rotate about its pivotal mountings in a clockwise direction. Since all vanes 17 are tied together, by the link 33, this set of vanes rotate in unison to direct the flow of air egressing from the grill 12 upwardly. Movement of knob 42 downwardly in a vertical plane will rotate the vanes 17 in a counter-clockwise direction to direct air downwardly of grill 12. By moving the knob 42 of the common actuator 40 in a horizontal direction paralleling the vanes 17 the actuator pivots about pin 44 and its legs, adjacent slot 47 therein, engage and swing or rotate all the vanes 23, through link 37, in unison to direct the flow of air egressing from the grill to one side or the other of air cooling unit 10. Thus the position of the one set of vanes 17 and the position of the other set of vanes 23 can be adjusted independently of one another. If it is desired to instantaneously swing all the vanes 17 and 23 of the sets thereof for directing air egressing from the grill 12 into an angular combined up or down and sidewise direction relative to unit 10 the knob 42 of the common actuator 40 is moved at an angle to the horizontal and to the vertical so as to simultaneously adjust the position of the sets of vanes relation to one another.

From the foregoing, it should be apparent that we have provided an improved air outlet grill for an air conditioning unit or the like. By virtue of the construction, arrangement and particularly the pivotal mounting of the vanes of the two sets thereof in the present air outlet grill in a single straight line plane the actuator therefor can be pivotally mounted on this same plane and can be moved to swing all the vanes simultaneously about their pivotal mountings to thus eliminate the necessity of operating two or more actuators or of swinging some of the vanes individually by hand.

While the forms of embodiment of the present invention as herein disclosed constitute preferred forms, it is to be understood that other forms might be adopted, as may come within the scope of the claims which follow.

What is claimed is as follows:

1. An air grill comprising in combination, a substantially rectangular frame having an air passage therein, a first vane extending along said frame and having its ends at one edge thereof pivotally mounted upon two opposed sides of said frame for directing air through the passage in one direction, a second vane extending along said frame transversely across said first vane for directing air through said passage in another direction, said second vane being disposed adjacent the other or swingable edge of said first vane and having means extending therearound and pivotally mounted upon two other opposed sides of said frame in the same plane with the pivotal mountings of said first vane, a common actuator on said grill pivotally mounted on said first vane and having an operative connection with said second vane for moving said vanes about their pivotal mountings, and said common actuator being movable relative to said frame in one plane to adjust the position of said first vane and movable in a different plane to adjust the position of said second vane.

2. An air grill comprising in combination, a substantially rectangular frame having an air passage therein, a first vane extending along said frame and having its ends at one edge thereof pivotally mounted upon two opposed sides of said frame for directing air through the passage in one direction, a second vane extending along said frame transversely across said first vane for directing air through said passage in another direction, said second vane being disposed adjacent the other or swingable edge of said first vane and having means extending therearound and pivotally mounted upon two other opposed sides of said frame in the same plane with the pivotal mountings of said first vane, a common actuator on said grill pivotally mounted on said first vane and having an operative connection with said second vane for moving said vanes about their pivotal mountings, said common actuator being movable relative to said frame in one plane to adjust the position of said first vane and movable in a different plane to adjust the position of said second vane, and said common actuator being movable in a plane intermediate said one and said different planes to simultaneously adjust the position of both of said vanes.

3. An air grill comprising in combination, a substantially rectangular frame having an air passage therein, a first vane extending along said frame and being pivotally mounted upon two opposed sides thereof for directing air through the passage in one direction, a second vane extending along said frame transversely across said first vane for directing air through said passage in another direction, said second vane having means extending around said first vane and pivotally mounted upon two other opposed sides of said frame in the same plane with the pivotal mountings of said first vane, a common actuator for moving said vanes about their pivotal mountings, and said common actuator including a portion pivotally supported on one of said vanes and having another portion thereof engageable with opposite sides of the other of said vanes to relatively move either vane one at a time and/or both of said vanes simultaneously.

References Cited in the file of this patent

UNITED STATES PATENTS

| | | |
|---|---|---|
| 1,850,822 | Young | Mar. 22, 1932 |
| 2,349,544 | Fiedler | May 23, 1944 |
| 2,365,319 | Young | Dec. 19, 1944 |
| 2,500,330 | Stover | Mar. 14, 1950 |
| 2,630,053 | Kennedy | Mar. 3, 1953 |
| 2,729,158 | Wilfert | Jan. 3, 1956 |